Jan. 7, 1958   F. C. ULLRICH   2,818,775
METHOD OF AND APPARATUS FOR OBJECTIVELY TESTING OPTICAL SYSTEMS
Filed May 11, 1954
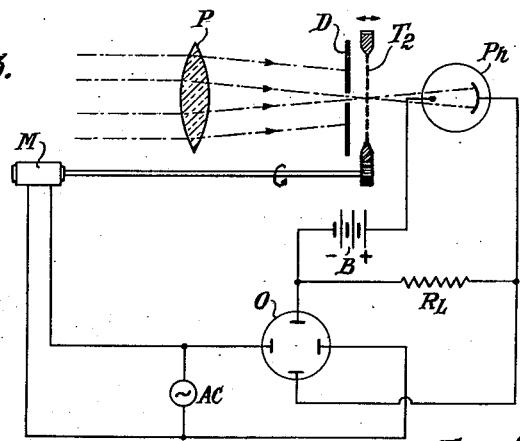
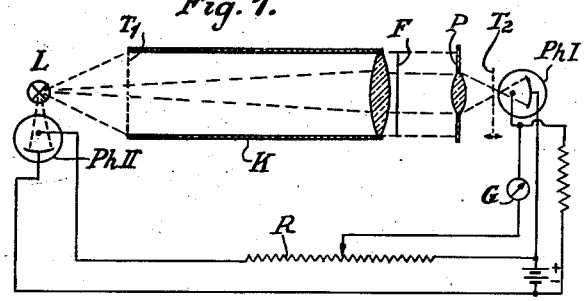
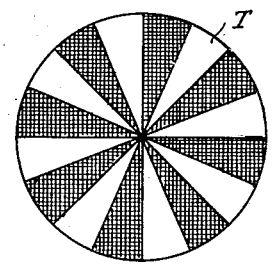
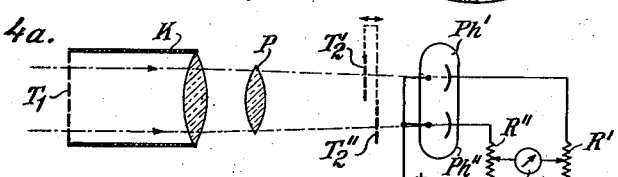
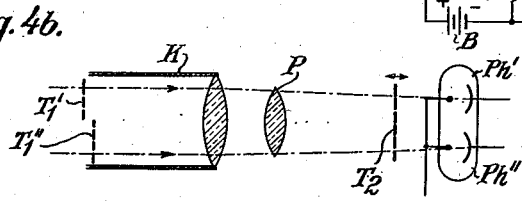
INVENTOR:
Fr. Chr. Ullrich
BY
Karl F. Ross
AGENT

United States Patent Office 2,818,775
Patented Jan. 7, 1958

2,818,775

METHOD OF AND APPARATUS FOR OBJECTIVELY TESTING OPTICAL SYSTEMS

Friedrich Christian Ullrich, Bad Kreuznach, Rhineland, Germany, assignor to Jos. Schneider & Co., Kreuznach, Rhineland, Germany Application May 11, 1954, Serial No. 429,030

Claims priority, application Germany May 12, 1953

7 Claims. (Cl. 88—56)

My present invention relates to a method of and apparatus for objectively testing optical systems by electric means.

Electrical testing methods have become widely accepted in practice, on account of their high sensitivity and simple application. It has, therefore, already been proposed to resort to electrical measuring in the art of testing optical systems, as an alternative to the hitherto customary photographic and visual methods. Such measuring can be carried out much more speedily than the relatively clumsy photographic processes and is largely independent of observational errors due to the inadequacy of the human eye.

Known electrical testing methods for optical systems are generally based on the principle of photoelectric scanning, the scanned object usually being a grid-like pattern whose light and dark areas give rise to a measurable alternating current. This requires the use of slitted scanning diaphragms and other complex equipment.

The chief object of the present invention is to provide a novel electrical testing method which can be implemented by relatively simple and inexpensive means, as well as an apparatus for carrying this method into practice.

A more specific object of this invention is to provide a testing method and apparatus of this character whose versatility enables the determination of a large variety of optical properties of the subject system.

Another more specific object of the invention is to provide a testing method and apparatus universally applicable to diverse optical systems.

In accordance with my invention, I use the optical system to be tested to project the image of a test pattern upon a light-transmissive surface bearing a pattern which registers with the first one. The second or receiving pattern may, for this purpose, be either the duplicate (positive) or the reverse (negative) of the first or transmitting pattern. The light passing beyond the second test pattern is photoelectrically converted into an electric current whose magnitude varies with changes in the effective distance between the two test patterns as brought about, for example, by a displacement of the second pattern relative to the focal plane of the system.

More specifically, there will be only one position in which the image of the first pattern coincides exactly with the second pattern. With two physically independent patterns, the position of the receiving pattern will then correspond to that of the image plane, i. e. of the focal plane of the system where a suitable collimator is used. This position is ascertainable from the fact that either a maximum or a minimum of light passes through the second pattern, depending on whether the same is the positive or the negative of the first pattern; thus the output current reaches an extreme value, i. e. either a maximum or a minimum, when the receiving pattern passes through the image plane.

The current, which may be direct or alternating current according to whether uniform or intermittent (e. g. "chopped") light traverses the light-transmissive surface, can be measured by any conventional instrument such as, for example, a galvanometer or a cathode ray oscilloscope, if necessary after suitable amplification. Since, in any event, only relative values need to be measured, the method according to the invention has all the advantages of a null method.

In order to achieve independence from variations in the focal length of the system to be tested, it is desirable to provide a test pattern which will maintain coincidence as the scale of projection is changed. The only such pattern is a sectoral star, i. e. a pattern composed of a plurality of alternately dark and light sectors of a circle. The initial alignment of the two sectoral patterns may be carried out manually on the basis of visual observations (aided by auxiliary optical equipment, if desired) in relatively simple manner because of the appearance of a pattern of distinct circles, whose number and size varies with the disalignment, on a projection surface back of the second test pattern; complete disappearance of these circles signifies the correct adjustment. Such adjustment may, of course, also be brought about automatically by suitable servo motors adapted to displace one of the test patterns, in a plane perpendicular to the optical axis of the system, in response to the amount of light received by a photoelectric device positioned back of the second test pattern.

It may be mentioned that the position of the focal plane need not be determined directly but can also be ascertained as the mean of two receiving-pattern positions, respectively ahead and back of that plane, in which equal defocusing results in equal deflections of the meter. The two measurements can be taken simultaneously by splitting one of the two test patterns into a pair of axially offset halves and determining separately the amount of light passed by each pattern half at the receiving end. In the latter case it will also be possible to obtain again a null reading by differentially applying the outputs of two light-sensitive devices, one for each pattern half, to a measuring instrument.

The invention will be more fully described with reference to the accompanying drawing in which:

Fig. 1 shows diagrammatically an apparatus for practicing the method according to the invention;

Fig. 2 shows a sectoral test pattern adapted to be used with the apparatus of Fig. 1;

Fig. 3 shows a modification of the apparatus of Fig. 1, having means for rotating the receiving test pattern;

Fig. 4a diagrammatically illustrates a modification of the apparatus of Fig. 1, comprising a split receiving test pattern; and Fig. 4b diagrammatically illustrates another modification, comprising a split transmitting pattern.

Referring to Fig. 1, there is shown a first test pattern $T_1$ at the entrance of a collimator tube K, this pattern being illuminated by light rays from a source here shown as a lamp L. The light source L should be stabilized to prevent short-range intensity fluctuations which might falsify the result. The optical system to be tested, e. g. a photographic objective illustrated schematically as a lens P, is positioned between the exit of collimator K and a second test pattern $T_2$ axially displaceable, in the region of the focal plane of system P, in front of a photoelectric cell $Ph_I$. The output of photocell $Ph_I$ and part of the output of a second photocell $Ph_{II}$, derived from a potentiometer R, are differentially applied to a galvanometer G. The photocell $Ph_{II}$ is directly illuminated from lamp L and serve to compensate for any not fully suppressed variations in the luminous output of this lamp.

It will be understood that the transmitting text pattern $T_1$, placed at virtual infinite distance from system P by the action of the collimator K, will produce a sharp image in the focal plane of the system where the transparent and movable carrier of the receiving test pattern $T_2$ is located. If both test patterns are identical and properly aligned sectoral stars, such as the simplified pattern T of Fig. 2, the amount of light falling on the photocell $Ph_1$ and, thereby, the deflection of galvanometer G will reach an extreme value in the correct focal position of pattern $T_2$. This value will be a maximum if the two patterns register angularly so that light from each white sector of pattern $T_1$ will wholly impinge upon a similar sector of pattern $T_2$; it will be a minimum if the two patterns are angularly offset by the width of a sector so that light from each white sector of pattern $T_1$ will be wholly absorbed by a black sector of pattern $T_2$.

Fig. 1 also shows how a color filter F may be interposed in the path of the light rays from source L, whereby the focal length and other properties of the optical system P may be determined, as more fully set forth hereinafter, for monochromatic light of different wavelengths.

In Fig. 3 I have shown the receiving end of an apparatus similar to that of Fig. 1 but provided with a motor M for rotating the test pattern $T_2$ with respect to pattern $T_1$ (not shown in Fig. 3). The motor M is synchronously driven from a source A. C. of alternating current which also energizes the horizontal deflection plates of a cathode ray oscilloscope O. The vertical plates of the oscilloscope are connected across the load resistance $R_L$ of photocell Ph which lies in series with its source of emission current shown as battery B. As the pattern $T_2$ rotates, the amount of light received by photocell Ph will alternate between a maximum and a minimum, the resulting pulsating current through resistance $R_L$ producing a voltage drop of varying magnitude across the vertical plates of oscilloscope O. Since the difference between the two current extremes will be greatest when the image of pattern $T_1$ is sharply focused upon pattern $T_2$, the correct focal position of the receiving test pattern will coincide with the maximum amplitude of the sinusoidal trace displayed on the screen of the oscilloscope.

The apparatus of Fig. 3 can also be used to determine the resolving power of the optical system P. This can be accomplished, after proper focusing of the test pattern $T_1$ on the carrier of pattern $T_2$, by positioning a diaphragm adjacent one of the test patterns and reducing its aperture until the alternations in the output of photocell Ph are no longer discernible. In Fig. 3 I have shown this diaphragm D positioned immediately ahead of the receiving test pattern $T_2$.

In Figs. 4a and 4b I have illustrated the determination of the focal plane with the aid of two axially offset half patterns. In Fig. 4a a transmitting test pattern $T_1$ is positioned at the focal plane of a collimator K preceding the optical system P in substantially the same manner as in Fig. 1; a pair of receiving half patterns $T_2'$, $T_2''$, relatively offset in the direction of the optical axis, are physically joined together for simultaneous axial displacement as indicated by the arrow. A pair of photocells Ph' and Ph'' (here shown disposed in a common envelope) are positioned behind the pattern halves $T_2'$ and $T_2''$, respectively, their output circuits including the battery B and respective load resistances R', R''. A galvanometer G, representative of any suitable measuring instrument, is shown connected between taps of these two load resistances.

When the pattern halves $T_2'$ and $T_2''$ are positioned on opposite sides of and equidistant from the focal plane of system P, the outputs of photocells Ph' and Ph'' will cancel in galvanometer G and this instrument will show zero deflection. Since any fluctuations in the intensity of the light source (not shown in Fig. 4a) will equally affect both photocells, no special compensatory arrangement is required with this embodiment.

Fig. 4b is similar to Fig. 4a except that now the stationary transmitting test pattern is split into two axially offset halves $T_1'$, $T_1''$, co-operating with a single movable receiving pattern $T_2$. The pattern halves $T_1'$, $T_1''$ are so positioned, on either side of the focal plane of collimator K, that their images will be equidistant from the focal plane of system P. When, therefore, the receiving pattern $T_2$ is correctly located, equal amounts of light will impinge through its upper and lower halves upon photocells Ph' and Ph'', respectively, so that a null reading will again be obtained from the galvanometer G (Fig. 4a) or equivalent measuring instrument.

It will be understood that a color filter F (Fig. 1) may be used with any of the embodiments shown in Figs. 3, 4a, 4b for the purpose of testing with monochromatic light.

The embodiments herein disclosed, and the numerous possible modifications thereof, may be used for the determination of various optical constants as well as aberrations of the subject system. The following tests are enumerated by way of illustration:

(1) Determination of optical constants by locating the position of optimum focus. These constants include:

(a) The design length of a camera incorporating the subject system;

(b) The focal length of the system, based upon the ascertainment of the respective image positions for two distinct positions of a test object (e. g. by the differential method or by Bessel's method);

(c) The distance scale of a camera, preferably by means of a virtual test object derived from an actual pattern-carrying object through a collimator, either by inserting a dispersing lens ahead of the collimator or by positioning the test object before the collimator at a variable distance equal to or less than its focal length.

(2) Determination of distortion-causing imperfections by observing the displacement of the image plane under different lighting conditions. These imperfections include:

(a) Chromatic aberration, determinable by charting the position of the image plane in dependence upon the aperture ratio, for different wavelengths, with the aid of color filters as shown in Fig. 1;

(b) Longitudinal spherical aberration, determinable from the shifting of the image plane upon selectively exposing different annular zones of the subject system by means of diaphragms with ring-shaped apertures;

(c) Sine law, from a combination of the procedures under (1)b and (2)b;

(d) Coma, determinable as per (2)b but with the use of light rays obliquely impinging (through suitable masks or diaphragms) on sagittal and meridional zones;

(e) Astigmatism, determinable as per (2)d but with very small objective apertures.

(3) Determination of optical resolving power, from minimum diaphragm opening as described in connection with Fig. 3.

The invention is, of course, not limited to the specific embodiments described and illustrated, nor is its use restricted to the tests and determinations particularly set out hereinabove. Thus it may be mentioned that not only the relative alignment of the test patterns but also the axial displacement to correct focusing position may be carried out by suitable servo equipment actuated, in a manner known per se, by the output of the photocells shown in the drawing.

I claim:

1. A method of testing an optical system, comprising the steps of projecting a test pattern through said system upon a light-transmissive surface bearing a congruent pattern, said patterns consisting of alternately light and dark but otherwise identical sectors of a circle, aligning said congruent pattern with the projected pattern, relatively rotating said patterns, relatively displacing said patterns along the optical axis of said system, measuring the amount of light traversing said surface, in different relative axial positions of said patterns, by photoelectrically converting said light into a pulsating current, and ascertaining the relative axial position of said patterns in which the amplitude of pulsations of said current reaches a maximum.

2. A method according to claim 1, including the further step of progressively reducing the effective area of at least one of said patterns and determining the resolving power of said system from the size of said area at the instant when said pulsations vanish.

3. An apparatus for testing an optical system, comprising a source of light rays, a first light-transmissive element in the path of said light rays bearing a test pattern, a second light-transmissive element carrying a pattern congruent with said test pattern each of said patterns being in the form of a sectoral star composed of alternately light and dark but otherwise identical sectors of a circle, means for projecting said test pattern upon said second element by directing said light rays through said system, means for aligning said congruent pattern with the projected pattern, means for focusing said projected pattern upon said second element by varying the distance between said light-transmissive elements, photoelectric means for converting light rays traversing said second element into an electric current, drive means for relatively rotating said elements at a rapid and uniform rate, thereby causing pulsations in said current, and measuring means for ascertaining the magnitude of said current, said measuring means being responsive to said pulsations.

4. An apparatus according to claim 3, wherein said measuring means includes oscilloscope means synchronized with said drive means.

5. An apparatus according to claim 3, wherein said photoelectric means comprises a first photosensitive device back of said second element, a second photosensitive device positioned for direct irradiation by said source of light rays, and circuit means for differentially applying output energy from both of said devices to said measuring means.

6. An apparatus according to claim 3, further including color filter means inserted in the path of said light rays.

7. An apparatus according to claim 3, further including masking means for selectively blocking off varying portions of said projected pattern.

References Cited in the file of this patent

UNITED STATES PATENTS

| | | |
|---|---|---|
| 2,052,844 | Prusso et al. | Sept. 1, 1936 |
| 2,254,548 | Ruhle et al. | Sept. 2, 1941 |
| 2,267,961 | Tillyer et al. | Dec. 30, 1941 |
| 2,385,503 | Glasser | Sept. 25, 1945 |